United States Patent
Garg et al.

(10) Patent No.: US 11,425,664 B1
(45) Date of Patent: Aug. 23, 2022

(54) DYNAMIC POWER ADJUSTMENT OF NETWORK TOWERS

(71) Applicant: T-Mobile USA, Inc., Bellevue, WA (US)

(72) Inventors: Parag Garg, Woodinville, WA (US); Joseph Baird, Kent, WA (US); Nicholas LaVassar, Issaquah, WA (US); Mehdi Piraee, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/385,702

(22) Filed: Jul. 26, 2021

(51) Int. Cl.
*H04W 52/34* (2009.01)
*H04W 84/18* (2009.01)
*H04W 4/40* (2018.01)
*H04W 52/02* (2009.01)
*H04W 52/38* (2009.01)

(52) U.S. Cl.
CPC ............ *H04W 52/34* (2013.01); *H04W 4/40* (2018.02); *H04W 52/0206* (2013.01); *H04W 52/0245* (2013.01); *H04W 52/386* (2013.01); *H04W 84/18* (2013.01)

(58) Field of Classification Search
CPC ... H04W 52/34; H04W 4/40; H04W 52/0206; H04W 52/386; H04W 84/18
USPC .................................................. 455/522, 69
See application file for complete search history.

(56) References Cited

U.S. PATENT DOCUMENTS

| | | | | |
|---|---|---|---|---|
| 7,203,494 B2* | 4/2007 | Flondro | .......... | H04W 36/00837 455/452.2 |
| 7,385,485 B2* | 6/2008 | Thomas | .............. | B60C 23/0445 340/447 |
| 7,864,742 B2* | 1/2011 | Bennett | ................. | H04W 88/04 370/313 |
| 7,986,247 B2* | 7/2011 | Bauer | .................... | G08G 1/162 340/904 |
| 7,990,283 B2* | 8/2011 | Breed | ..................... | G01S 19/42 340/995.13 |
| 8,145,199 B2* | 3/2012 | Tadayon | .............. | H04B 5/0062 455/418 |
| 8,463,276 B2* | 6/2013 | Chou | .................. | H04W 52/244 455/418 |
| 8,738,069 B2* | 5/2014 | Yamamoto | ............ | H04W 52/28 370/318 |

(Continued)

FOREIGN PATENT DOCUMENTS

CA 2369918 C * 6/2009 ............ H04W 52/04
WO WO-2014089520 A1 * 6/2014 ............ H01L 28/75

*Primary Examiner* — Hai V Nguyen
(74) *Attorney, Agent, or Firm* — Han Santos, PLLC (57) ABSTRACT

Methods, systems, and apparatus, including computer programs encoded on a computer storage medium, for dynamically adjusting the power of network towers are disclosed. In one aspect, a method includes the actions of receiving, by a computing device, data that reflects characteristics of a vehicle. The actions further include, based on the data that reflects the characteristics of the vehicle, determining, by the computing device, whether to adjust a setting of a base station of a wireless network. The actions further include, based on determining whether to adjust the setting of the base station of the wireless network, determining, by the computing device, whether to provide, for output to the base station of the wireless network, an instruction to adjust the setting of the base station.

20 Claims, 4 Drawing Sheets

(56) References Cited

U.S. PATENT DOCUMENTS

| | | | | |
|---|---|---|---|---|
| 8,913,966 B2* | 12/2014 | Bennett | H04W 52/04 | 370/395.2 |
| 8,977,284 B2* | 3/2015 | Reed | H04W 64/006 | 455/425 |
| 8,995,938 B2* | 3/2015 | Ali | H04B 1/3838 | 455/127.1 |
| 9,124,703 B2* | 9/2015 | Tadayon | H04W 4/029 | |
| 9,332,126 B2* | 5/2016 | Tadayon | H04M 3/53 | |
| 9,365,155 B2* | 6/2016 | Hathaway | G08B 21/02 | |
| 9,738,222 B2* | 8/2017 | Hathaway | B60Q 9/008 | |
| 9,756,573 B2* | 9/2017 | Wallerius | H04W 52/243 | |
| 9,769,305 B2* | 9/2017 | Banerjee | H04W 4/024 | |
| 9,788,282 B2* | 10/2017 | Neves | H04W 52/24 | |
| 9,894,492 B1* | 2/2018 | Elangovan | H04W 4/40 | |
| 9,955,436 B2* | 4/2018 | Neves | H04W 52/386 | |
| 10,046,699 B2* | 8/2018 | Hathaway | B60Q 1/525 | |
| 10,192,379 B2* | 1/2019 | Odejerte, Jr. | H04W 12/122 | |
| 10,384,604 B2* | 8/2019 | Hathaway | G01S 13/931 | |
| 10,475,268 B2* | 11/2019 | Saiki | E05B 49/00 | |
| 10,510,198 B2* | 12/2019 | Austen | B60R 25/241 | |
| 10,650,621 B1* | 5/2020 | King | H04L 67/12 | |
| 10,728,862 B2* | 7/2020 | Zhang | H04W 52/40 | |
| 10,771,945 B2* | 9/2020 | Ossin | H04W 4/029 | |
| 10,779,189 B2* | 9/2020 | Khoryaev | H04L 47/32 | |
| 10,826,556 B2* | 11/2020 | Malarky | H04W 52/38 | |
| 10,953,796 B2* | 3/2021 | Hathaway | G01S 13/931 | |
| 11,069,082 B1* | 7/2021 | Ebrahimi Afrouzi | H04N 5/2256 | |
| 11,153,503 B1* | 10/2021 | Ebrahimi Afrouzi | G06V 10/25 | |
| 11,183,882 B2* | 11/2021 | Yeo | H02J 7/00034 | |
| 11,197,166 B2* | 12/2021 | Damnjanovic | H04W 56/0015 | |
| 11,232,655 B2* | 1/2022 | Bhattacharyya | H04L 12/40032 | |
| 11,240,651 B2* | 2/2022 | Ossin | H04W 64/006 | |
| 2006/0064232 A1* | 3/2006 | Ampunan | B60W 40/02 | 701/115 |
| 2006/0105769 A1* | 5/2006 | Flondro | H04W 36/00837 | 455/437 |
| 2006/0220805 A1* | 10/2006 | Thomas | B60C 23/0454 | 73/146 |
| 2007/0184852 A1* | 8/2007 | Johnson | H04W 64/00 | 455/456.1 |
| 2008/0042876 A1* | 2/2008 | Bauer | G08G 1/162 | 340/905 |
| 2008/0095222 A1* | 4/2008 | VanLaningham | H04L 45/02 | 375/227 |
| 2010/0052945 A1* | 3/2010 | Breed | G01S 17/89 | 340/903 |
| 2010/0261467 A1* | 10/2010 | Chou | H04W 52/40 | 455/422.1 |
| 2011/0106375 A1* | 5/2011 | Gurusamy Sundaram | H04W 4/00 | 701/31.4 |
| 2011/0195699 A1* | 8/2011 | Tadayon | H04W 48/02 | 455/418 |
| 2011/0319127 A1* | 12/2011 | Yamamoto | H04W 52/383 | 455/73 |
| 2012/0149341 A1* | 6/2012 | Tadayon | H04W 48/02 | 455/412.1 |
| 2012/0214472 A1* | 8/2012 | Tadayon | H04W 4/029 | 455/418 |
| 2014/0309885 A1* | 10/2014 | Ricci | G01C 21/3691 | 701/41 |
| 2015/0091716 A1* | 4/2015 | Hathaway | G08G 1/162 | 340/435 |
| 2015/0173023 A1* | 6/2015 | Wallerius | H04W 52/386 | 455/437 |
| 2015/0319707 A1* | 11/2015 | Abdelmonem | H04J 11/0066 | 455/522 |
| 2016/0021237 A1* | 1/2016 | Banerjee | H04W 4/44 | 370/311 |
| 2016/0132397 A1* | 5/2016 | Hui | G06F 11/0709 | 714/4.11 |
| 2016/0304028 A1* | 10/2016 | Hathaway | G01S 13/931 | |
| 2017/0156119 A1* | 6/2017 | Neves | H04W 52/143 | |
| 2017/0327142 A1* | 11/2017 | Hannah | B62B 5/0096 | |
| 2017/0349096 A1* | 12/2017 | Hathaway | G08G 1/0955 | |
| 2018/0035391 A1* | 2/2018 | Neves | H04W 52/24 | |
| 2018/0056936 A1* | 3/2018 | Parasu | B60R 25/1001 | |
| 2018/0077709 A1* | 3/2018 | Gerszberg | H04B 7/022 | |
| 2018/0089622 A1* | 3/2018 | Burch, V | B64D 47/08 | |
| 2018/0130275 A1* | 5/2018 | Odejerte, Jr. | H04W 4/80 | |
| 2018/0146506 A1* | 5/2018 | Zhang | H04W 56/001 | |
| 2018/0242190 A1* | 8/2018 | Khoryaev | H04W 28/0226 | |
| 2018/0249429 A1* | 8/2018 | Zhang | H04W 52/40 | |
| 2018/0308305 A1* | 10/2018 | Austen | B60R 25/2018 | |
| 2018/0324569 A1* | 11/2018 | Ossin | H04W 64/006 | |
| 2018/0332456 A1* | 11/2018 | Ossin | B60R 25/102 | |
| 2018/0367973 A1* | 12/2018 | Bloechl | H04W 48/20 | |
| 2019/0001885 A1* | 1/2019 | Hathaway | G01S 13/931 | |
| 2019/0028182 A1* | 1/2019 | Smyth | H04W 24/08 | |
| 2019/0147678 A1* | 5/2019 | Saiki | B60R 25/24 | 340/5.64 |
| 2019/0215058 A1* | 7/2019 | Smyth | H04B 7/18502 | |
| 2019/0280763 A1* | 9/2019 | Smyth | H04B 7/18517 | |
| 2019/0366926 A1* | 12/2019 | Hathaway | G08G 1/052 | |
| 2020/0021138 A1* | 1/2020 | Yeo | H02J 50/90 | |
| 2020/0077892 A1* | 3/2020 | Tran | G16H 40/67 | |
| 2020/0225673 A1* | 7/2020 | Ebrahimi Afrouzi | G05D 1/0016 | |
| 2020/0273268 A1* | 8/2020 | Bhattacharyya | H04W 4/40 | |
| 2020/0336997 A1* | 10/2020 | Zhang | H04W 52/247 | |
| 2020/0344643 A1* | 10/2020 | Zhou | H04W 28/0231 | |
| 2020/0374702 A1* | 11/2020 | Damnjanovic | H04W 72/0453 | |
| 2020/0404069 A1* | 12/2020 | Li | G06F 9/4862 | |
| 2021/0044926 A1* | 2/2021 | Talluri | H04W 68/005 | |
| 2021/0213901 A1* | 7/2021 | Yamamoto | B60R 25/102 | |
| 2022/0014215 A1* | 1/2022 | Amiri | H04B 7/0608 | |
| 2022/0041102 A1* | 2/2022 | Hathaway | B60Q 1/525 | |

* cited by examiner

DYNAMIC POWER ADJUSTMENT OF NETWORK TOWERS

BACKGROUND

Various components of a wireless carrier network are located outside. When the weather changes, the ability of the components to communicate with user devices and with other components may be affected. High levels of moisture in the air may decrease the strength of a wireless signal, and some clouds may reflect signals.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

A vehicle to everything (C-V2X) application can be leveraged to improve the diagnostic operation and performance of network towers during inclement weather conditions. Particularly, data collected by vehicle weather-related sensors can be used as a reference for dynamic power adjustment in the network tower. As opposed to using a received signal strength indicator (RSSI) for the dynamic power adjustment, data metrics from these sensors can provide more accurate/reliable information in determining the real-time effect of actual weather conditions within a particular geographic area.

In some implementations, a vehicle equipped with weather-related sensors may collect data that relate to inclement weather conditions and send the collected data to a central network. The collected data may include direction and speed of vehicles, detected moisture/temperature/humidity, direction of sudden deceleration of vehicles, speed of wipers indicating amount of rain, and barometric pressures. The central network processes the collected data to generate a particular adjustment (e.g., transmission power) in the network tower. In some implementations, the central network indirectly calculates the corresponding RSSI from the collected data instead of directly measuring the RSSI from an impacted area, which may generally provide inaccurate results due to signal reflections and degradations from the inclement weather. In one example, machine learning models may be used on the weather-related data to facilitate the adjustment of the network tower and to achieve network performance goals (e.g., call quality, calls dropped) in the impacted area.

In some implementations, where the adjusted network tower is disconnected from the central network, the central network may collect emergency messages from vehicles coming from the impacted area, and the central network may send reply messages via vehicles that that are projected to be travelling towards the impacted area. The vehicles and/or phones therein may be considered nodes in a migrating mesh or swarm network that uses disconnected network towers as reliable nodes. To achieve reliability goals, some degree of redundancy is desirable when distributing message payloads to migrating nodes. The degree of redundancy, node selection and other distribution parameters may be determined and/or optimized based on the weather-related data including, again, via the use of the machine learning models.

Figure 1:
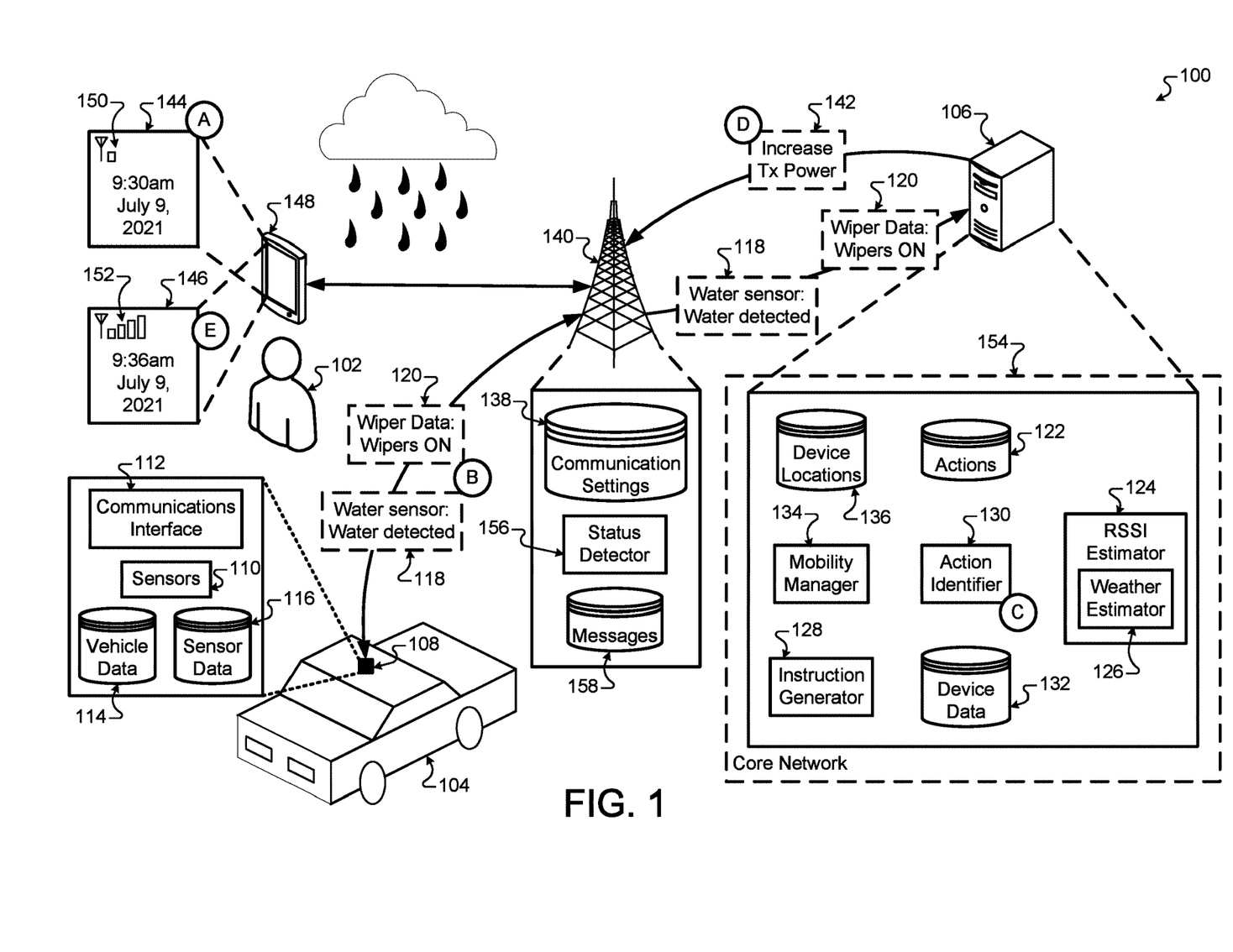
FIG. 1 illustrates an example system that is configured to determine weather conditions based on data from a vehicle and adjust the settings of a network tower based on the weather conditions.

FIG. 1 illustrates an example system 100 that is configured to determine weather conditions based on data from a vehicle 104 and adjust the settings of a base station 140 based on the weather conditions. Briefly, and as described in more detail below, the system 100 includes a server 106 that is configured to receive sensor data 116 and vehicle data 114 from a computing device 108. Based on the sensor data 116 and vehicle data 114, the server 106 determines likely weather conditions for the location of the vehicle 104. Based on those likely weather conditions, the server 106 estimates the RSSI for devices communicating with the base station 140. Based on the estimated RSSI, the server 106 may instruct the base station 140 to adjust the communication settings 138. FIG. 1 includes various stages A through E that may illustrate the movement of data between the server 106 and other computing devices. The system 100 may perform these stages in any order.

In stage A, the user 102 may be interacting with the computing device 148. The computing device 148 may be communicating with the base station 140 of a wireless carrier network. The computing device 148 may be any type of device that is configured to communicate with the wireless carrier network. For example, the computing device 148 may be a mobile device, a tablet, a laptop computer, a desktop computer, a smart watch, an internet of things device, or any other similar type of device. The user 102 may be in a location that is experiencing inclement weather. This may include rain, snow, sleet, and/or any other weather that may affect the temperature, humidity, and/or atmospheric pressure. This inclement weather may affect the ability of the computing device 148 and the base station 140 to communicate. As indicated in the interface 144 that is on the display of the computing device 148, the network reception indicator 150 may indicate that the connection between the base station 140 and the computing device 148 is weak.

The computing device 148 and the user 102 may be in the vicinity of the vehicle 104. The vehicle 104 may include a computing device 108 that receives vehicle data 114 through the on-board diagnostic port of the vehicle 104. For example, the computing device 108 may plug into the on-board diagnostic port and receive vehicle diagnostic data through the on-board diagnostic port. In some implementations, the computing device 108 may be integrated into the vehicle and receive vehicle diagnostic data from a computer of the vehicle 104 without connecting to the on-board diagnostic port. The vehicle diagnostic data may include data related to a status of the vehicle. The vehicle diagnostic data may include real-time vehicle information (engine revolutions per minute, vehicle speed, spark advance, airflow rate, coolant temperature, tire pressure, airbag status, etc.), status of the check engine light, emission readiness status, diagnostic codes, oxygen sensor results, miles driven, vehicle identification number, and/or any other similar vehicle data. The vehicle diagnostic data may also include the status of various equipment on the vehicle. For example, the status of various equipment on the vehicle may include the status of windshield wipers, headlights, blinkers, fog lights, defroster, climate control system, and/or any other similar equipment.

The computing device 108 may include various sensors 110 that are configured to detect the movement of the computing device 108, the location of the computing device 108, and/or the environment around the computing device 108. For example, the sensors 110 may include an accelerometer, a gyroscope, a GPS receiver, a barometer, an ambient light sensor, a camera, a compass, a gravity sensor, a proximity sensor, a magnetometer, a microphone, hygrometer, water sensor, solar flux sensor, ultraviolet light detector, and/or any other similar sensors. In some implementations, the similar sensors may be integrated into the vehicle 104. For example, the vehicle may include an additional accelerometer, gyroscope, GPS receiver, barometer, ambient light sensor, camera, compass, gravity sensor, proximity sensor, magnetometer, microphone, hygrometer, water sensor, solar flux sensor, ultraviolet light detector, and/or any other similar sensors. These sensors may be located inside or outside of the vehicle 104. In some instances, the vehicle 104 may include duplicate sensors with one inside the passenger area of the vehicle 104 and another on the outside of the vehicle 104. The computing device 108 may receive data from these additional sensors and store the additional sensor data in the sensor data 116.

The computing device 108 may store the data collected from the sensors 110 in the sensor data 116. The computing device 108 may store data from the sensors 110 in the sensor data 116 at periodic intervals, such as every ten seconds. The computing device 108 may store data from the sensors 110 while the vehicle is on, stationary, in motion, or moving at least at a threshold speed. The computing device 108 may receive or request the vehicle diagnostic data at periodic intervals, such as every ten seconds. The computing device 108 may receive or request the vehicle diagnostic data while the vehicle is on, stationary, in motion, or moving at least at a threshold speed. In some implementations, the computing device 108 may receive or request the vehicle diagnostic data at the same time that the computing device 108 generates and stores data from the sensors 110. The computing device 108 may be configured to store the most recent data in the vehicle data 114 and the sensor data 116. For example, the computing device 108 may store the most recent hour of data in the vehicle data 114 and the sensor data 116.

The computing device 108 may include a communications interface 112. The communications interface 112 may include communication components that enable the computing device 108 to transmit data and receive data from other devices. For example, the communications interface 112 may be able to receive and exchange data with the server 106. The communication interface 112 may include an interface that is configured to communicate with the base station 140 and other base stations of a wireless carrier network. In some implementations, the communication interface 112 may be configured to communicate over a wide area network, a local area network, the internet, a wired connection, a wireless connection, and/or any other type of network or connection. The wireless connections may include Wi-Fi, short-range radio, infrared, and/or any other wireless connection. In some implementations, the communication interface 112 may include an interface that is configured to connect to an on-board diagnostic port of the vehicle 104.

The communications interface 112 may periodically transmit the vehicle data 114 and the sensor data 116 to the server 106, such as every ten seconds. In some implementations, the communications interface 112 may transmit the vehicle data 114 and the sensor data 116 to the server 106 in response to a request from the server 106. In some implementations, the communications interface 112 may transmit the vehicle data 114 and the sensor data 116 to the server 106 based on detecting a change in the vehicle 102. For example, the communications interface 112 may transmit the vehicle data 114 and the sensor data 116 to the server 106 based on the acceleration of the vehicle being greater than a threshold, such as more than fifteen miles per hour per second which may occur if the speed of the vehicle 104 decreases at a rate of fifteen miles per hour in less than a second. As another example, the communications interface 112 may transmit the vehicle data 114 and the sensor data 116 to the server 106 in response to a change in the vehicle data 114 and/or the sensor data 116. For example, the computing device 108 may detect a change in the accelerometer data that is greater than a threshold. Based on detecting that change, the communications interface 112 may transmit the vehicle data 114 and the sensor data 116 to the server 106.

In stage B, the vehicle 104 may be traveling during the inclement weather. The windshield wipers may be active. The vehicle 104 may include a water sensor on the outside of the vehicle that is configured to detect the presence of water on the vehicle. This water sensor may provide water sensor data 118 to the computing device 108. In some instances, the water sensor may be connected to an embedded computer or processor in the vehicle 104. The embedded computer or processor in the vehicle 104 may provide data indicating that the water sensor detected water to the computing device 108. The computing device 108 may also receive wiper data 120. The computing device 108 may detect that the wipers of the vehicle 120 are active and/or receive data from the embedded computer or processor in the vehicle 104.

The computing device 108 may provide the water sensor data 118 and the wiper data 120 to the server 106 via the base station 140. The computing device 108 may provide additional sensor data 116 from the sensors 110 included in the computing device 108, additional sensors included in the vehicle 104, vehicle data 114 that may include various vehicle diagnostic data and data related to the status of equipment of the vehicle, and/or any additional data related to the status of the vehicle or the status of the environment around the vehicle.

The server 106 may receive the water sensor data 118, the wiper data 120, and/or any additional sensor data 116 and vehicle data 114. The server 106 may store the water sensor data 118, the wiper data 120, and/or any additional sensor data 116 and vehicle data 114 in the device data 132. Based on the water sensor data 118, the wiper data 120, and/or any additional sensor data 116 and vehicle data 114, the server 106 may determine an impact that the environment around the vehicle 104 may have on the wireless carrier network in the vicinity of the vehicle 104. The server 106 may include an RSSI estimator 124 that is configured to estimate the RSSI of computing devices that are in the vicinity of the vehicle 104 and/or communicating with the base station 140. These computing devices may include those belonging to nearby pedestrians, those located in nearby buildings, those located in nearby cars, and/or any other similarly located devices. In this case, the server 106 may not receive the RSSI from the computing devices, such as computing device 148, that are in the vicinity of the vehicle 104 and/or communicating with the base station 140. The RSSI estimator 124 may estimate an RSSI for the computing devices in the vicinity of the vehicle 104 and/or communicating with the base station 140 based on the water sensor data 118, the wiper data 120, and/or any additional sensor data 116 and vehicle data 114.

In some implementations, the server 106 may instruct the RSSI estimator 124 to estimate the RSSI for the computing devices in the vicinity of the vehicle 104 and/or communicating with the base station 140 based on the server 106 not receiving RSSI data from the base station 140. In some instances, the base station 140 may indicate to the server 106 that the base station 140 is not receiving RSSI data from computing devices communicating with the base station 140. In some instances, the base station 140 may be unable to transmit RSSI data from the computing devices to the server 106.

The RSSI estimator 124 may include a weather estimator 126 that is configured to estimate the weather conditions in the vicinity of the computing device 108 of vehicle 104. The weather estimator 126 may be configured to analyze the water sensor data 118, the wiper data 120, and/or any additional sensor data 116 and vehicle data 114 from the vehicle 104 to determine the likely weather conditions. The weather estimator 126 may use a combination of rules and/or models to determine the likely weather conditions. The rules may specify how to compare the water sensor data 118, the wiper data 120, and/or any additional sensor data 116 and vehicle data 114 from the vehicle 104. Based on that comparison, the rules may specify likely weather conditions. For example, if the wipers are on and the water sensor on the outside of the vehicle 104 indicates the presence of water, then the weather is likely rainy. Other rules may directly relate sensor data and/or vehicle data to weather conditions. For example, the hydrometer and thermometer on the outside of the vehicle 104 may specify the temperature and humidity in the vicinity of the vehicle 104. The barometer on the inside or outside of the vehicle may specify the atmospheric pressure in the vicinity of the vehicle 104.

In some instances, the weather estimator 126 may use one or more models that are configured to receive the water sensor data 118, the wiper data 120, and/or any additional sensor data 116 and vehicle data 114 from the vehicle 104 and output the likely weather conditions in the vicinity of the vehicle 104. For example, a model may receive water sensor data 118 that indicates that water was detected outside the vehicle, wiper data 120 indicating that the wipers are off, temperature data indicating that the temperature outside the vehicle 104 is ninety degrees, humidity data indicating that the relative humidity outside the vehicle 104 is thirty percent, and pressure data indicating that the atmospheric pressure is 29.90 inches of mercury and rising. The model may output data indicating that the there is no precipitation, the temperature is ninety degrees, and the humidity is thirty percent.

The RSSI estimator 124 may analyze the estimated weather conditions from the weather estimator to estimate the RSSI of computing devices in the vicinity of the vehicle 104 and/or communicating with the base station 140. The RSSI estimator 124 may use a models and/or rules to estimate the RSSI of computing devices in the vicinity of the vehicle 104 and/or communicating with the base station 140. The rules may specify how to compare the estimated weather conditions to determine an estimated RSSI. The models may be configured to receive the estimated weather conditions and output data indicated an estimated RSSI of computing devices in the vicinity of the vehicle 104 and/or communicating with the base station 140. The RSSI estimator 124 may be configured to determine the RSSI on a scale of zero to thirty. A value of zero may indicate no received signal, and a value of thirty may indicate an excellent signal.

For example, a rule may specify that if the weather is raining, then the estimated RSSI may be ten. Another rule may specify that if there is no precipitation, the temperature is between seventy and eighty degrees, and the humidity is greater than sixty-five percent, then the RSSI may be fifteen. Another rule may specify that if there is no precipitation, the temperature is between seventy and eighty degrees, and the humidity is below thirty percent, then the RSSI may be twenty-five. An example model may receive data indicating that it is raining, the temperature is fifty degrees, and the humidity sixty percent. The model may output data indicating that the RSSI is twelve.

The server 106 may include a mobility manager 134. The mobility manager 134 may be configured to monitor the location of a computing device that is connected to the server 106 through a wireless base station, such as the base station 140. The location of the computing device may include the location of the wireless base station to which the computing device is connected and/or GPS data received from the computing device. The mobility manager 134 may store the location data in the device locations 136 of the server 106.

In some implementations, the mobility manager 134 may determine the location of a computing device at periodic intervals, such as every five seconds. In some implementations, the mobility manager 134 may determine the location of a computing device when the computing device connects to a different wireless base station and/or provides updated GPS data. In some implementations, the mobility manager 134 may determine the location of the computing device relative to the base station with which the computing device is communicating. In this case, the mobility manager 134 may determine the relative location based on data collected from the base station such as signal strength and direction of communications between the computing device and the base station. The mobility manager 134 may also determine the relative location based on the location of the base station and GPS data received from the computing device. The relative location data may include a distance between the computing device and the base station, the cardinal direction from the base station to the subscriber device, and/or any other similar measurements.

In some implementations, the server 106 may receive the water sensor data 118, the wiper data 120, and/or any additional sensor data 116 and vehicle data 114 from the computing device 108 of the vehicle 104 and access the device locations 136 to determine the location of the computing device 108. The server 106 may store the water sensor data 118, the wiper data 120, and/or any additional sensor data 116 and vehicle data 114 in the device data 132 in connection with location data from the device locations 136. The server 106 may also store a timestamp with the water sensor data 118, the wiper data 120, and/or any additional sensor data 116 and vehicle data 114 in the device data 132. As the server 106 receives additional sensor and vehicle data from the computing device 108, the server 106 may access the location of the computing device 108 from the device locations 136. The server 106 may store the additional sensor and vehicle data in connection with the additional location data and a timestamp.

With the device data 132 including sensor and vehicle data from multiple vehicles and corresponding location data and timestamps, the RSSI estimator 124 may generate estimated RSSIs for multiple locations at various points in time. For example, for a first point in time, the device data 132 may include sensor and vehicle data from a first computing device at a first location and sensor and vehicle data from a second computing device at a second location. The RSSI estimator 124 may determine, for the first point in time, a first estimated RSSI for the first location and a second estimated RSSI for the second location. For a second point in time, the device data 132 may include sensor and vehicle data from a third computing device at a third location. The RSSI estimator 124 may determine, for the second point in time, a third estimated RSSI for the third location. For a third point in time, the device data 132 may include sensor and vehicle data from the first computing device that has not moved to a fourth location. The estimator 124 may determine, for the third point in time, a fourth estimated RSSI for the fourth location.

The server 106 may include an action identifier 130 that is configured to select one or more actions from the actions 122 based on the estimated RSSIs from the RSSI estimator 124. The action identifier 130 may select an action to adjust the communication settings 138 to improve communication between base stations that may be located in areas with inclement weather. Some of the actions 122 may include adjusting the transmission power of a base station, adjusting the directionality of transmissions from the base station, adjusting the frequency of the base station, adjusting a modulation scheme of the base station, and/or any other similar adjustment action. The action identifier 130 may select an action that is configured to increase the estimated RSSIs in the case of the estimated RSSIs being below an RSSI threshold.

In some instances, the action identifier 130 may be configured to select the action of increasing the transmission power of a base station if the estimated RSSIs for computing devices in the vicinity of a vehicle are below an RSSI threshold. Based on the difference between the RSSI threshold and the estimated RSSIs, the action identifier 130 may select a different increase level of the transmission power. For example, if the difference between the RSSI threshold and the estimated RSSIs is five, then the action identifier 130 may determine to increase the transmission power by three decibel milliwatts. If the difference between the RSSI threshold and the estimated RSSIs is ten, then the action identifier 130 may determine to increase the transmission power by five decibel milliwatts.

In some instances, the action identifier 130 may be configured to select the action of increasing the transmission power of a base station in different directions. For example, the difference between the RSSI threshold and the estimated RSSIs in a northwest direction of the base station may be ten. In this case, the action identifier 130 may determine to increase the transmission power of the base station by five milliwatts in the northwest direction. The action identifier 130 may determine to maintain the transmission power of the base station in the other directions. As another example, the difference between the RSSI threshold and the estimated RSSIs in an east direction of the base station may be seven. The difference between the RSSI threshold and the estimated RSSIs in a south direction of the base station may be ten. In this case, the the action identifier 130 may determine to increase the transmission power of the base station by five milliwatts in the east direction. The action identifier 130 may determine to increase the transmission power of the base station by eight milliwatts in the south direction.

In the example of FIG. 1 and in stage C, the server 106 may receive the water sensor data 118, the wiper data 120, and/or any additional sensor data 116 and vehicle data 114. The weather estimator 126 may analyze the water sensor data 118, the wiper data 120, and/or any additional sensor data 116 and vehicle data 114. The weather estimator 126 may determine that, in the vicinity of the vehicle 104, the weather is likely raining, the temperature is fifty degrees, and the humidity is seventy percent. Based on that weather, the RSSI estimator 124 may determine that the estimated RSSI for a computing device, such as the computing device 148, in the vicinity of the vehicle 104 is ten. The RSSI estimator 124 may provide the estimated RSSI value of ten to the action identifier 130. The action identifier 130 may determine an action of increasing the transmission power of the base station 140 that is in the vicinity of the vehicle 104. The action identifier 130 may determine to increase the power by five decibel milliwatts based on the difference between the estimated RSSI value and the RSSI threshold being ten.

The server 106 may include an instruction generator 128 that is configured to generate an instruction 142 to provide to the base station 140 based on the action identified by the action identifier 130. The instruction 142 may include a request to adjust a communication setting of the communication settings 138 of the base station 140. In the example of FIG. 1 and in stage D, if the action identifier 130 determines to increase the transmission power of the base station 140 by five decibel milliwatts, then the instruction generator 128 may generate and transmit an instruction 142 to increase the transmission power of the base station 140 by five decibel milliwatts.

In some implementations, the instruction generator 128 may generate an instruction 142 that requests the base station to confirm when the instructions are executed. In this case, the instruction generator 128 may provide the instruction 142 to the base station 140 and receive a confirmation from the base station 140 indicating that the base station 140 increased the transmission power. The instruction generator 128 may provide that confirmation information to the action identifier 130. The action identifier 130 may use the information of the base station 140 having increased the transmission power as a factor in determining a subsequent instruction for the base station 140 or other base stations.

The base station 140 may comply with the instructions 142 to increase the transmission power of the base station 140. The communication settings 138 of the base station 140 may reflect the increased transmission power. With the transmission power of the base station 140 increased, the computing device 148 may experience an improvement in the ability to communicate with the base station 140. In the example of FIG. 1 and in stage E, the interface 146 on the display of the computing device 148 may include a reception indicator 152. The reception indicator 152 may indicate improved reception with the wireless carrier network compared to the reception indicator 150 which represented the ability of computing device 148 and the base station 140 to communicate before the base station 140 increased the transmission power.

The base station 140 may include a status detector 156 and messages 158. The status detector 156 may be configured to monitor the communication status of the base station 140. The communication status may be normal. In this case, the base station 140 may be able to communicate with nearby computing devices such as computing devices 108 and 148, the server 106, and other nearby base stations. The communication status may indicate a fault. In this case, status detector 156 may indicate the devices with which the base station 140 is unable to communicate, such as other nearby computing devices, the server 106, and/or the nearby base stations.

In cases where the status detector 156 indicates that the base station 140 is unable to communicate with the server 106 and is able to communicate with nearby computing devices and nearby base stations, the status detector 156 may store incoming messages from the nearby computing devices in the messages 158. The messages 158 may store any type of communication data transmitted from the nearby computing devices. The communication data may include text-based messages, images, videos, audio message, and/or any other similar type of data that a computing device may transmit to other computing devices. The base station 140 may store the messages 158 to ensure that the messages are not lost because the base station 140 is unable to transmit the messages to the server 106.

The base station 140 may include functionality similar to the server 106. For example, the base station 140 may receive and store the device data 132 and include the weather estimator 126. The status detector 156 indicates that the base station 140 is unable to communicate with the server 106 and is able to communicate with nearby computing devices and nearby base stations. In this case, the weather estimator of the base station 140 may access the device data to determine the nearby weather conditions. Based on the weather conditions, the base station 140 may be able to determine the cause of the communication error. For example, the base station 140 may be able to determine that the communication error is because of inclement weather. In this case, the base station 140 may attempt to deliver the messages 158 in an alternate manner instead of transmitting them to the server 106.

The alternate manner for the base station 140 to deliver the messages 158 may be for the base station 140 to transmit the messages 158 to the nearby computing devices. The base station 140 may transmit the same message to multiple nearby computing devices. In some cases, a computing device may receive the same message the computing device sent to the base station 140. The base station 140 may transmit the messages to the computing devices with instructions to transmit them to them to other base stations that may be in communication with the server 106. This may occur if the computing devices are moving because a people are holding them or they are located in vehicles. When the computing devices are able to communicate with a new base station, the computing devices may attempt to transmit the messages received from the base station 140. The computing devices may attempt to determine whether the new base station is able to communicate with the server 106 before transmitting the messages. If the new base station is able to communicate with the server 106, then the computing devices may transmit the messages. If the new base station is unable to communicate with the server 106, then the computing devices may attempt to deliver the message to another base station when the computing devices are able to communicate with the other base station.

Figure 2:
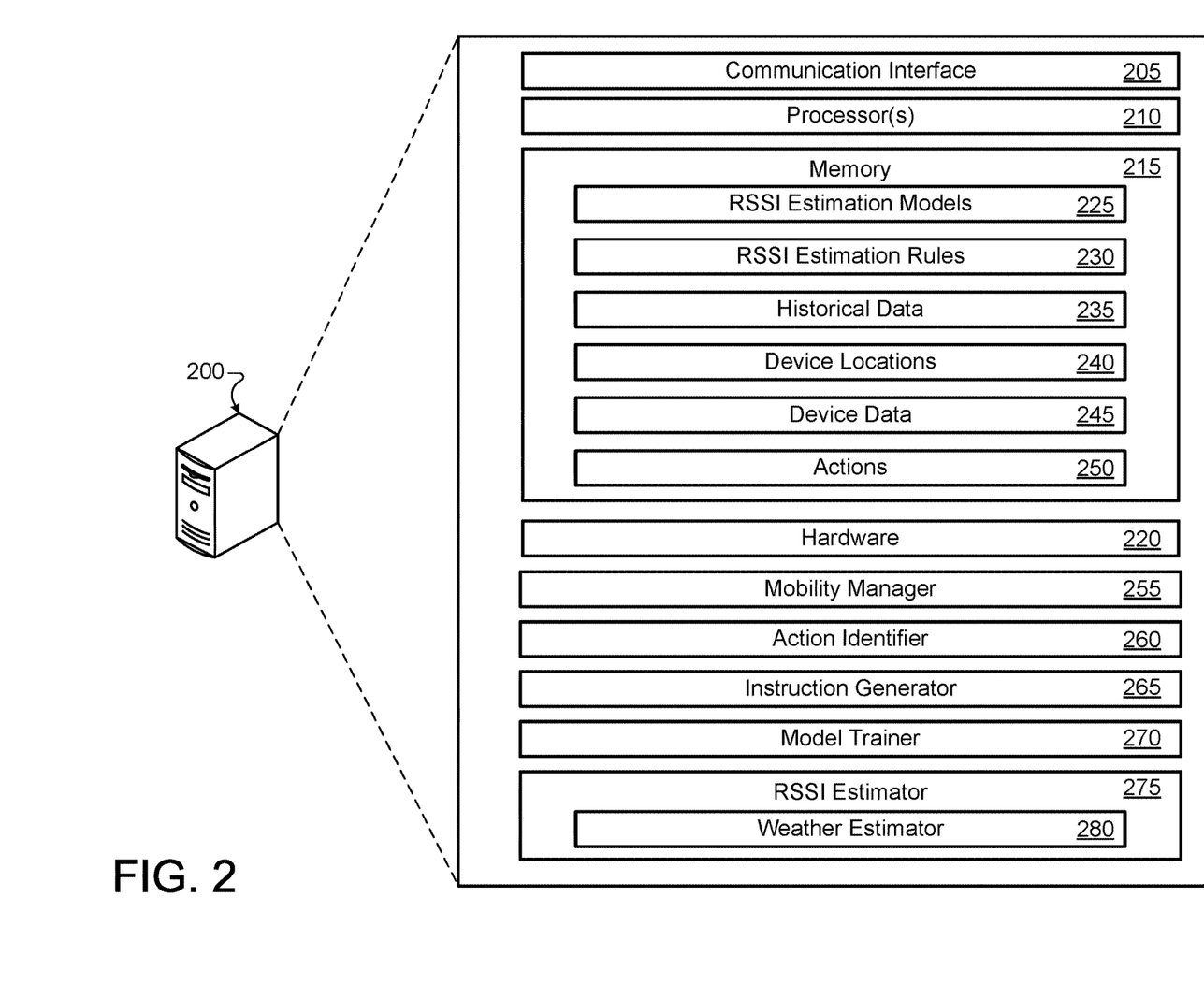
FIG. 2 illustrates an example server that is configured to determine weather conditions based on data from a vehicle and adjust the settings of a network tower based on the weather conditions.

FIG. 2 illustrates an example server 200 that is configured to determine weather conditions based on data from a vehicle and adjust the settings of a network tower based on the weather conditions. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate using over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 255. The mobility manager 255 may be similar to the mobility manager 134 of FIG. 1. The mobility manager 255 may be configured to monitor the location of a computing device that is connected to the server 200 through a wireless base station. The location of the computing device may include the location of the wireless base station to which the computing device is connected and/or GPS data received from the computing device. The mobility manager 255 may store the location data in the device locations 240 of the server 200.

In some implementations, the mobility manager 255 may determine the location of a computing device at periodic intervals, such as every five seconds. In some implementations, the mobility manager 255 may determine the location of a computing device when the computing device connects to a different wireless base station and/or provides updated GPS data. In some implementations, the mobility manager 255 may determine the location of the computing device relative to the base station with which the computing device is communicating. In this case, the mobility manager 255 may determine the relative location based on data collected from the base station such as signal strength and direction of communications between the computing device and the base station. The mobility manager 255 may also determine the relative location based on the location of the base station and GPS data received from the computing device. The relative location data may include a distance between the computing device and the base station, the cardinal direction from the base station to the subscriber device, and/or any other similar measurements.

The memory 215 may store device data 245 that includes sensor data and vehicle data received from computing devices in various vehicles. The device data 245 may include timestamps that indicate when the server 200 received and/or when the corresponding computing device detected the underlying conditions of the sensor data and vehicle data. The device data 245 may associate each computing device and/or vehicle with a group of sensor data and vehicle data that each have a corresponding timestamp. The server 200 may also store the location of the various vehicles and/or computing devices in the device data 245. In this case, the device data 245 may associate each computing device and/or vehicle with a group of sensor data and vehicle data that each have a corresponding timestamp and location. With the device data 245, the movement of the computing device and/or vehicle, the timing of the movement of the computing device and/or vehicle, and the sensor data and vehicle data generated as the computing device and/or vehicle moved may be apparent.

The one or more processors 210 may implement an RSSI estimator 275. The RSSI estimator 275 may be similar to the RSSI estimator 124 of FIG. 1. The RSSI estimator 275 may be configured to estimate the RSSI of computing devices that are in the vicinity of the various vehicles that have vehicle and sensor data stored in the device data 245. The RSSI estimator 275 may estimate the RSSI of computing devices that are configured to communicate with a wireless carrier network through a base station. These computing devices may include devices such as mobile phones.

The RSSI estimator 275 may include a weather estimator 280. The weather estimator 280 may be similar to the weather estimator 126 of FIG. 1. The weather estimator 280 may be configured to estimate the weather conditions in the vicinity of the vehicles that have with sensor data and vehicle data in the device data 245. The weather estimator 280 may be configured to analyze device data 245 to determine the likely weather conditions at the locations of the various vehicles. The weather estimator 280 may use a combination of rules and/or models to determine the likely weather conditions. The rules may specify how to compare the device data 245. Based on that comparison, the rules may specify likely weather conditions. For example, if the wipers are on and the water sensor on the outside of a vehicle indicates the presence of water, then the weather is likely rainy. Other rules may directly relate the device data 245 to weather conditions. For example, the hydrometer and thermometer on the outside of a vehicle may specify the temperature and humidity in the vicinity of the vehicle. The barometer on the inside or outside of the vehicle may specify the atmospheric pressure in the vicinity of the vehicle.

In some instances, the weather estimator 280 may use one or more models that are configured to receive the device data 245 and output the likely weather conditions in the vicinity of the vehicles related to the device data 245. For example, a model may receive water sensor data that indicates that water was detected outside the vehicle, wiper data indicating that the wipers are off, temperature data indicating that the temperature outside the vehicle is ninety degrees, humidity data indicating that the relative humidity outside the vehicle is thirty percent, and pressure data indicating that the atmospheric pressure is 29.90 inches of mercury and rising. The model may output data indicating that the there is no precipitation, the temperature is ninety degrees, and the humidity is thirty percent.

The RSSI estimator 275 may analyze the estimated weather conditions from the weather estimator 280 to estimate the RSSI of computing devices in the vicinity of the vehicle and/or communicating with a base station of the wireless carrier network. The RSSI estimator 275 may use a models and/or rules to estimate the RSSI of computing devices in the vicinity of the vehicle and/or communicating with the base station. The rules may specify how to compare the estimated weather conditions to determine an estimated RSSI. The models may be configured to receive the estimated weather conditions and output data indicated an estimated RSSI of computing devices in the vicinity of the vehicle and/or communicating with the base station. The RSSI estimator 275 may be configured to determine the RSSI on a scale of zero to thirty. A value of zero may indicate no received signal, and a value of thirty may indicate an excellent signal.

For example, a rule may specify that if the weather is raining, then the estimated RSSI may be ten. Another rule may specify that if there is no precipitation, the temperature is between seventy and eighty degrees, and the humidity is greater than sixty-five percent, then the RSSI may be fifteen. Another rule may specify that if there is no precipitation, the temperature is between seventy and eighty degrees, and the humidity is below thirty percent, then the RSSI may be twenty-five. An example model may receive data indicating that it is raining, the temperature is fifty degrees, and the humidity sixty percent. The model may output data indicating that the RSSI is twelve.

The one or more processors 210 may implement an action identifier 260. The action identifier 260 may be similar to the action identifier 130 of FIG. 1. The action identifier 260 may be configured to select one or more actions from the actions 250 based on the estimated RSSIs from the RSSI estimator 275. The action identifier 260 may select an action to adjust the communication settings of the base station to improve communication between base stations that may be located in areas with inclement weather. Some of the actions 250 may include adjusting the transmission power of a base station, adjusting the directionality of transmissions from the base station, adjusting the frequency of the base station, adjusting a modulation scheme of the base station, and/or any other similar adjustment action. The action identifier 260 may select an action that is configured to increase the estimated RSSIs in the case of the estimated RSSIs being below an RSSI threshold.

In some instances, the action identifier 260 may be configured to select the action of increasing the transmission power of a base station if the estimated RSSIs for computing devices in the vicinity of a vehicle are below an RSSI threshold. Based on the difference between the RSSI threshold and the estimated RSSIs, the action identifier 260 may select a different increase level of the transmission power. For example, if the difference between the RSSI threshold and the estimated RSSIs is five, then the action identifier 260 may determine to increase the transmission power by three decibel milliwatts. If the difference between the RSSI threshold and the estimated RSSIs is ten, then the action identifier 260 may determine to increase the transmission power by five decibel milliwatts.

In some instances, the action identifier 260 may be configured to select the action of increasing the transmission power of a base station in different directions. For example, the difference between the RSSI threshold and the estimated RSSIs in a northwest direction of the base station may be ten. In this case, the action identifier 260 may determine to increase the transmission power of the base station by five milliwatts in the northwest direction. The action identifier 260 may determine to maintain the transmission power of the base station in the other directions. As another example, the difference between the RSSI threshold and the estimated RSSIs in an east direction of the base station may be seven. The difference between the RSSI threshold and the estimated RSSIs in a south direction of the base station may be ten. In this case, the action identifier 260 may determine to increase the transmission power of the base station by five milliwatts in the east direction. The action identifier 260 may determine to increase the transmission power of the base station by eight milliwatts in the south direction.

The one or more processors 210 may implement an instruction generator 265. The instruction generator 265 may be similar to the instruction generator 128 of FIG. 1. The instruction generator 265 may be configured to generate an instruction to provide to the base station based on the action identified by the action identifier 260. The instruction may include a request to adjust a communication setting of the base station. For example, if the action identifier 260 determines to increase the transmission power of the base station by five decibel milliwatts, then the instruction generator 265 may generate and transmit an instruction to increase the transmission power of the base station by five decibel milliwatts.

In some implementations, the instruction generator 265 may generate an instruction that requests the base station to confirm when the instructions are executed. In this case, the instruction generator 265 may provide the instruction to the base station and receive a confirmation from the base station indicating that the base station increased the transmission power. The instruction generator 265 may provide that confirmation information to the action identifier 260. The action identifier 260 may use the information of the base station having increased the transmission power as a factor in determining a subsequent instruction for the base station.

The RSSI estimator 275, weather estimator 280, and/or the action identifier 260 may use rules and/or models to estimate the RSSI, estimate the weather, and identify an action, respectively. The RSSI estimation models 225 may store the models, and the RSSI estimation rules 230 may store the rules. The model trainer 270 may be configured to generate the models and rules based on the historical data 235.

The historical data 235 may include data from a variety of scenarios. Some of the historical data 235 may include the RSSIs measured by various computing devices along with the corresponding weather conditions and the communication settings of the base stations with which the various computing devices were communicating. For example, the historical data 235 may include the RSSI measurements and location data from a mobile phone at five minute intervals over a period of two days. The location data may include data identifying the location of the mobile phone. For each RSSI measurement, the historical data 235 may include the weather conditions of the location of the mobile phone. The historical data 235 may also include, for each RSSI measurement, data identifying the base station with which the mobile phone was communicating. The historical data 235 may include, for each RSSI measurement, the transmission power of communications between the mobile phone and the base station, the directionality of communications between the mobile phone and the base station, the frequency of communications between the mobile phone and the base station, the modulation scheme of communications between the mobile phone and the base station, and/or other similar communication settings. The historical data 235 may also include timestamps that reflect the time of the RSSI measurements, the weather conditions, and the base station communication settings. The historical data 235 may include similar RSSI, weather, and base station communication settings from additional computing devices collected in similar and/or different locations on the same or different days.

The historical data 235 may also include vehicle data and sensor data collected from devices embedded and/or attached vehicles, the location of the vehicle, and/or corresponding weather conditions. For example, the historical data 235 may include vehicle data and sensor data collected from a vehicle as the vehicle moved around a city during a period of four days. The historical data 235 may include the weather conditions for the location of the vehicle when the vehicle collected the vehicle data and sensor data. The historical data 235 may include corresponding location data and timestamp data for the vehicle data, sensor data, and weather conditions. The historical data 235 may include similar vehicle data, sensor data, and weather conditions collected from other vehicles in similar and/or different locations on the same or different days.

The model trainer 270 may generate the rules of the RSSI estimation rules 230 by analyzing the historical data 235. The model trainer 270 may identify patterns in the historical data 235 and generate a rule based on the patterns. Some of the rules may specify how to compare various pieces of data to determine an estimated RSSI, estimate weather conditions, and/or determine an action to improve communications on a wireless carrier network during inclement weather. As an example, the model trainer 270 may identify a pattern that when the wipers of a vehicle are on and the headlights of the vehicle are on, then it is likely raining at the location of the vehicle. The model trainer 270 may identify another pattern that when the weather is rainy or the humidity is above seventy percent, then the RSSI of a device in those conditions is fifteen. The model trainer 270 may identify another pattern that when the weather is raining or the humidity, the RSSI of a device is higher if the transmission power of the nearby base station is higher.

The model trainer 270 may generate the models of the RSSI estimation models 225 by generating data samples from the historical data 235. The model trainer 270 may use the data samples to train, using machine learning, the RSSI estimation models 225. Depending on the data samples, different models may be configured to receive and output different types of data. The data samples may reflect, at a point in time, the state of the weather, sensor data from a vehicle, vehicle data from the vehicle, the communication settings of a base station, the measured RSSI of a mobile device, the locations of the vehicle, mobile device, and base station, and/or any other similar data in the historical data 235.

As an example, the model trainer 270 may generate data samples that include vehicle data and sensor data collected from multiple vehicles and the corresponding weather conditions at the locations of the vehicles when the vehicle data and sensor data was collected. The model trainer 270 may train, using machine learning, a model that is configured to receive vehicle data and sensor data from a vehicle and output data indicating the likely weather conditions at the location of the vehicle. In some implementations, the model may output a confidence score that reflects the likelihood that the weather conditions are accurate.

As another example, the model trainer 270 may generate data samples that include vehicle data and sensor data collected from multiple vehicles, RSSI values measured by mobile devices, and the location of the mobile devices and vehicles. The model trainer may generate multiple data samples from the same vehicle data and sensor data or RSSI values. The model trainer 270 may determine a threshold distance between the vehicles and the mobile devices for generating the data samples. If the mobile device and the vehicle are within a threshold distance, then the model trainer 270 may generate a data sample based on the vehicle data and sensor data and RSSI values collected when the mobile device and the vehicle were within the threshold distance. There may be multiple mobile devices within the threshold distance of a vehicle, and there may be multiple vehicles within the threshold distance of a mobile device. A data sample may include the vehicle data and sensor data from a vehicle, the RSSI value measured by a mobile device when the vehicle collected the vehicle data and sensor data, the location of the vehicle, and the location of the mobile device. If there are additional vehicles within the threshold distance of the mobile device, then the model trainer 270 may generate additional data samples with the same RSSI values from the mobile device. If there are additional mobile devices within the threshold distance of the vehicle, then the model trainer 270 may generate additional data samples with the same vehicle data and sensor data from the vehicle. Using these data samples, the model trainer 270 may train a model that is configured to receive vehicle data and sensor data from a vehicle and the location of the vehicle. The model may be configured to output an estimated RSSI value of a mobile device. The output may include multiple estimated RSSI values at various distances from the vehicle. For example, the model may output estimated RSSI values one hundred meters, two hundred meters, and three hundred meters from the vehicle. In some instances, the model may be configured to receive a distance from the vehicle for the estimated RSSI value. The model may output an estimated RSSI value for that distance from the vehicle. In some implementations, the model may output a confidence score that reflects the likelihood that the estimated RSSI value is accurate.

The model trainer 270 may generate different groups of data samples depending on the vehicle data and sensor data received from the vehicle. The historical data 235 may include vehicle data and sensor data from a vehicle that includes speed data, wiper data, and headlight data. The historical data 235 may also include vehicle data and sensor data from another vehicle that includes speed data, wiper data, headlight data, temperature data, humidity data, and water sensor data. The historical data 235 may also include vehicle data and sensor data from another vehicle that includes speed data, headlight data, temperature data, and humidity data. The model trainer 270 may group data samples with similar types of vehicle data and sensor data. The resulting models may be configured to receive those same types of vehicle data and sensor data. In this case, the RSSI estimator 275, the weather estimator 280, and/or the action identifier 260 may be configured to select a model from the RSSI estimated models 225 that is configured to receive the same type of data that the RSSI estimator 275, the weather estimator 280, and/or the action identifier 260 received.

As another example of data samples, the model trainer 270 may generate data samples that include measured RSSI values and communication settings from base stations. The data samples may also include the location of the mobile device that measures the RSSI value and the location of the base station. In some instances, the model trainer 270 may generate a data sample based on data from a mobile device and a base station that were communicating. With data samples that include measured RSSI values from mobile devices, communication settings from base stations communicating with the mobile devices, and data identifying the locations of the mobile devices and the base station, the model trainer 270 may be configured to train a model that is configured to receive an estimated or measured RSSI value of a mobile device, the location of the mobile device, the location of the base station, and the communication settings of the base station. The model trainer 270 may output data indicating an adjustment to the communication settings to improve the RSSI value. Similar to the description above, the model trainer 270 may train multiple models that are configured to receive different types of communication settings depending on the communication settings in the data samples.

As another example of data samples, the model trainer 270 may generate data samples that include vehicle data and sensor data from vehicles, measured RSSI values from mobile devices, and communication settings of base stations. The data samples may also include the location of the vehicles, the mobile devices, and the base stations. For a data sample, the corresponding mobile device and base station may be communicating. Using these data samples, the model trainer 270 may train a model that is configured to receive vehicle data and sensor data from a vehicle, the location of a base station, the location of the vehicle, and the communication settings of the base station communicating with the vehicle. The model may be configured to output an adjustment to the communication settings that is configured to improve the RSSI of mobile devices communicating with the base station. With this type of model, the action identifier 260 may be able to identify an adjustment to the communication settings of the base station without the RSSI estimator 275 estimated an RSSI value and/or the weather estimator 280 estimating the weather.

In some implementations, the server 200 may receive the vehicle data and sensor data from one or more vehicles. The vehicle data and sensor data may include location data. The device locations 240 may include location data of the vehicle and/or nearby mobile devices. The server 200 may also access communication settings from base stations near the location of the vehicles. The action identifier 260, the RSSI estimator 275, and the weather estimator 280 may determine how to select an action for adjusting the communication settings of a base station based on the models include in the RSSI estimation models 225. The action identifier 260 may determine whether the RSSI estimation models 225 includes a model that is configured to receive the vehicle data and sensor data, the location of the vehicle, the location of a base station, and the communication settings of the base station and output an adjustment to the communication settings to improve the communication between mobile devices and the base station. If the action identifier 260 does identify an appropriate model, then the action identifier 260 may provide the data to the model and receive the adjustment to the communication settings of the base station. The action identifier 260 may provide the adjustment to the instruction generator 265. If the action identifier 260 does not identify an appropriate model, then the RSSI estimator 275 may determine whether the RSSI estimation models 225 include an appropriate model.

The RSSI estimator 275 may access the RSSI estimation models 225 to determine if there is a model that is configured to receive the vehicle data and sensor data, the location of the vehicle, and the location of a base station and output an estimated RSSI value. If the RSSI estimator 275 identifies an appropriate model, then the RSSI estimator 275 may use the model to determine an estimated RSSI. The RSSI estimator 275 may provide the estimated RSSI to the action identifier 260. If the RSSI estimator 275 is unable to identify an appropriate model, then the weather estimator 280 may access the RSSI estimation models 225 to determine if there is a model that is configured to receive the vehicle data and sensor data and output the estimated weather at the location of the vehicle. The weather estimator 280 may provide the estimated weather to the RSSI estimator 275.

Based on the determinations of the action identifier 260, the RSSI estimator 275, and the weather estimator 280, the instruction generator 265 may provide an instruction to the base station to adjust the communication settings to improve the communication between the base station and mobile devices. The server 200 may continue to receive additional vehicle data and sensor data. Based on the additional vehicle data and sensor data, the action identifier 260, the RSSI estimator 275, and the weather estimator 280 may continue determine any additional adjustments to the communication settings to improve the communication between the base station and mobile devices.

Figure 3:
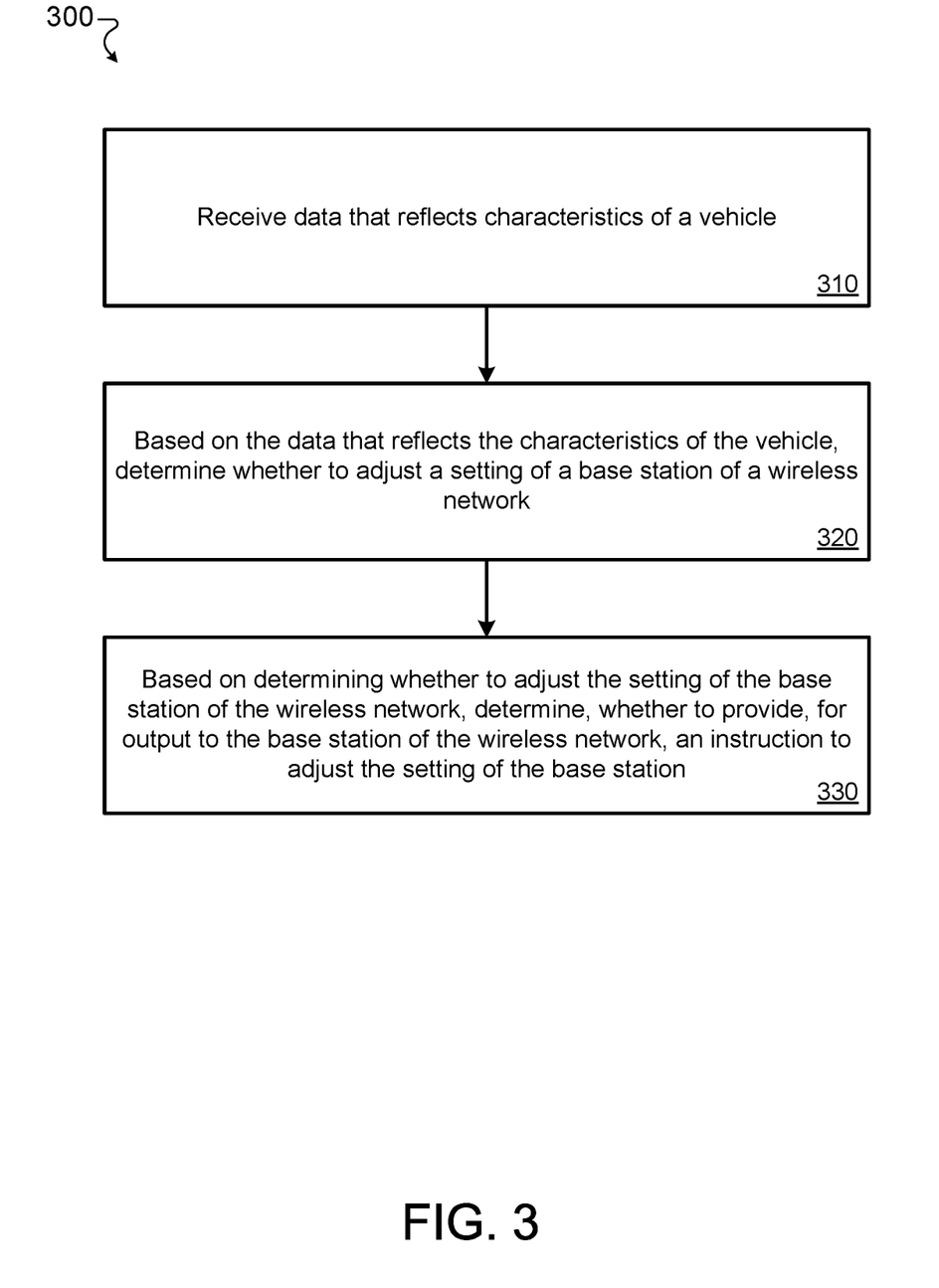
FIG. 3 is a flowchart of an example process for determining whether to adjust the settings of a network tower based on weather conditions that are based on data from a vehicle.

FIG. 3 is a flowchart of an example process 300 for determining whether to adjust the settings of a network tower based on weather conditions that are based on data from a vehicle. In general, the process 300 receives data from a computing device located in a vehicle. That data may reflect the characteristics of the vehicle. Based on that data, the process 300 determines whether to adjust the settings of the network tower in order to improve communication between devices and the wireless carrier network of the network tower. The process 300 will be described as being performed by the server 106 of FIG. 1 and will include references to other components in FIG. 1. The process 300 may also be performed by the server 200 of FIG. 2.

The server 106 receives data that reflects characteristics of a vehicle 104 (310). The server 106 may receive the characteristics of the vehicle 104 from a computing device 108 that may be connected to the vehicle 104. The computing device 104 may include various sensors 110 that are configured to detect the conditions in and of the vehicle 104. The computing device 108 may receive vehicle data from the vehicle 104. The characteristics of the vehicle 104 may include the vehicle data and the sensor data and may include speed data, location data, braking data, engine temperature data, tire pressure data, engine speed data, accelerometer data, gyroscope data, magnetometer data, gravity sensor data, humidity inside the vehicle, humidity outside the vehicle, temperature inside the vehicle, temperature outside the vehicle, windshield wiper status, and atmospheric pressure. The computing device 108 may be connected to an on-board diagnostic port of the vehicle. Some of this data may be received from the vehicle through the on-board diagnostic port, and some may be generated by sensors 110 that are included in the computing device 108.

Based on the data that reflects the characteristics of the vehicle, the server 106 determines whether to adjust a setting of a base station 140 of a wireless network (320). Based on determining whether to adjust the setting of the base station 140 of the wireless network, the server 106 determines whether to provide, for output to the base station of the wireless network, an instruction to adjust the setting of the base station 140 (330). In some implementations, the base station 140 may be within a threshold distance, such as one mile, of the vehicle. In some implementations, the server 106 may determine to adjust the setting of the base station 140. In this case, the server 106 may provide, for output to the base station, an instruction to adjust the setting of the base station 140. The instructions may specify the adjustment to the setting of the base station, such as increasing the transmission power level by a specific amount, such as five decibel milliwatts. In some implementations, the server 106 may determine to bypass adjusting the setting of the base station 140. In this case, the server 106 may bypass providing, for output to the base station 140, an instruction to adjust the setting of the base station 140.

In some implementations, the setting of the base station 140 is a transmission power level of the base station, the directionality of transmissions from the base station 140, the frequency of the base station 140, and/or the modulation scheme of the base station 140. In some implementations, the server 106 determines the weather conditions in the vicinity of the vehicle. In this case, the server 106 may determine whether to adjust the setting of the base station 140 based on the weather conditions. In some implementations, the server 106 determines an estimated RSSI for a device 148 communicating with the base station 140. The server 106 may determine whether to adjust the setting of the base station 140 based on the estimated RSSI. In some implementations, the server 106 may determine whether to adjust the setting of the base station 140 without receiving the RSSI from the device 148.

Figure 4:
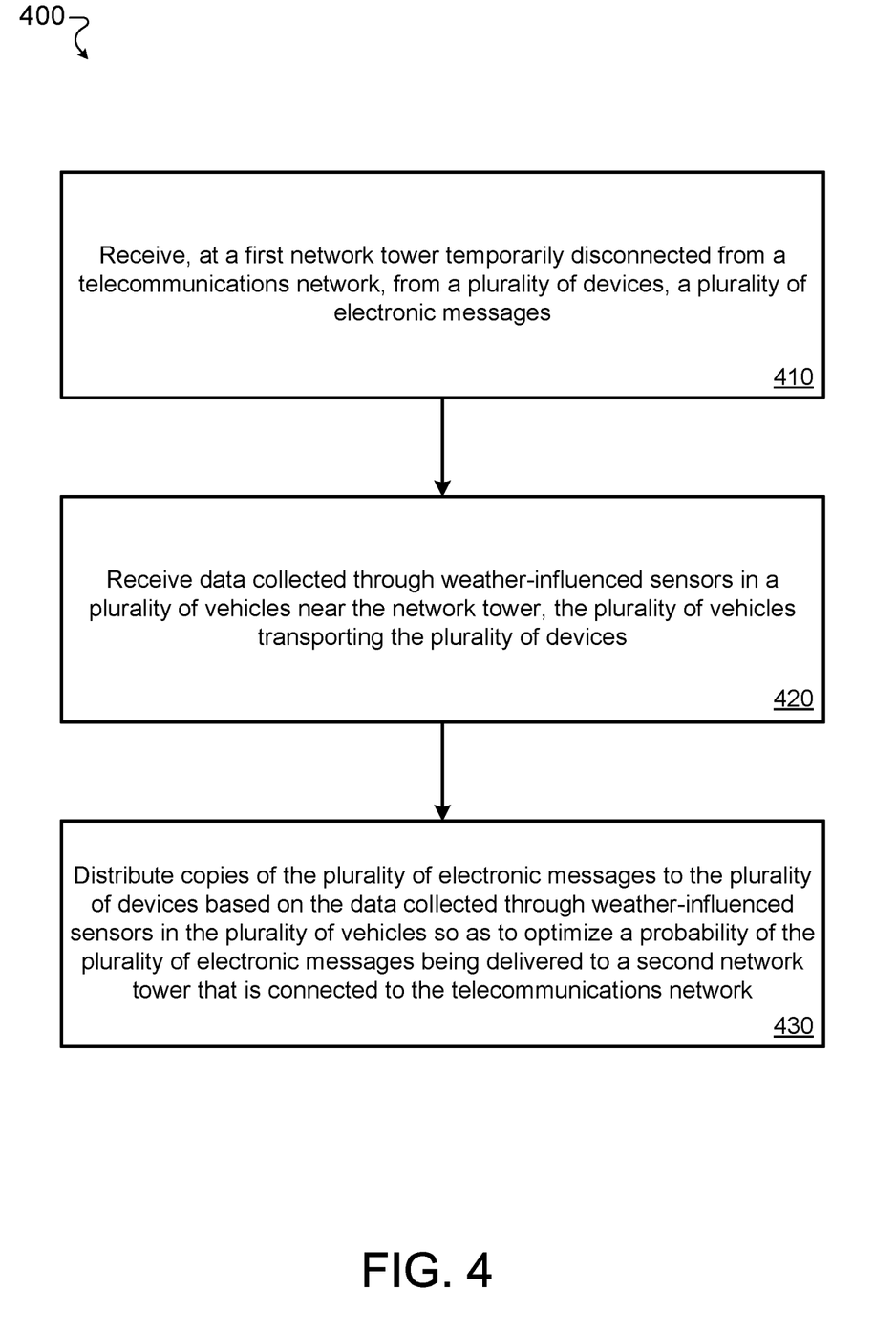
FIG. 4 is a flowchart of an example process for improving the reliability of wireless networks during inclement weather.

FIG. 4 is a flowchart of an example process 400 for improving the reliability of wireless networks during inclement weather. In general, the process 400 receives data from a device that is attempting to communicate with a wireless carrier network. The device may be a mobile device such as a phone or a device that provides sensor data and vehicle data from a vehicle. If a base station that receives the data is unable to communicate with the wireless carrier network, then the base station may attempt to transmit copies of the data to other nearby devices in hopes that the other nearby devices will move and transmit that data to a different base station that is able to communicate with the wireless carrier network. The process 400 will be described as being performed by the base station 140 of FIG. 1 and will include references to other components in FIG. 1.

The base station 140, temporarily disconnected from a telecommunications network, receives from a plurality of devices, a plurality of electronic messages (410). The base station 140 may be in a state where the base station 140 is unable to communicate with the server 106 and/or other base stations. The base station 140 may be able to communicate with the device 148 and other devices. The device 148 may transmit an electronic message to the base station 140. This electronic message may be a text-based message, an audio message, a video message, and/or any other similar type of message. The user 102 may be sending the electronic message to another user of another device.

The base station 140 receives data collected through weather-influenced sensors 110 in a plurality of vehicles near the base station 140 (420). The base station 140 may receive the collected data from a computing device that is configured to communicate with the vehicle 104, such as computing device 108. The weather-influenced sensors 110 may be embedded in the vehicle 104 and/or in the computing device. The collected data may include vehicle data and the sensor data and may include speed data, location data, braking data, engine temperature data, tire pressure data, engine speed data, accelerometer data, gyroscope data, magnetometer data, gravity sensor data, humidity inside the vehicle, humidity outside the vehicle, temperature inside the vehicle, temperature outside the vehicle, windshield wiper status, and atmospheric pressure. The computing device 108 may be connected to an on-board diagnostic port of the vehicle. Some of this data may be received from the vehicle through the on-board diagnostic port, and some may be generated by sensors 110 that are included in the computing device 108. In some implementations, the device 148 may be located in the vehicle 104. The vehicle 104 and the device 148 may be located in the same vicinity such that they are communicating with the same base station 140.

The base station 140 distributes copies of the plurality of electronic messages to the plurality of devices based on the data collected through weather-influenced sensors in the plurality of vehicles so as to optimize a probability of the plurality of electronic messages being delivered to a second network tower that is connected to the telecommunications network (430). Because the base station 140 may be able to communicate with nearby device 148 and other nearby devices, the base station 140 may determine to transmit the message to the other nearby devices. The base station 140 may include instructions for transmitting the message to another base station when the nearby devices are able to communicate with those base stations. The instructions may also indicate the intended recipient of the message. By transmitting the message to nearby devices, the base station 140 may improve the likelihood that the message will reach its intended recipient.

The base station 140 may use the data collected through weather-influenced sensors 110 to determine whether to distribute copies of the plurality of electronic messages to the nearby devices. The base station 140 may use the collected data to determine whether inclement weather is likely the cause for the base station 140 being unable to communicate with the server 106. The base station 140 may include functionality similar to the weather estimator 126 that may be able to estimate the weather conditions in the vicinity of the vehicle 104 and/or the base station 140. The weather estimator 126 may use rules and/or models to analyze the collected data to estimate the weather. Based on the estimated weather, the base station 140 may determine whether inclement weather is likely the cause for the base station 140 being unable to communicate with the server 106.

There may be various classifications of weather events that are likely to cause the base station 140 to be unable to communicate with the server 106. This may include thunderstorms, snow, winds above a threshold speed (e.g., fifty miles per hour), and/or any other similar weather event. If the weather estimator 126 determines that any of these conditions exist, then it is likely that the base station 140 lost connectivity with the server 106 because of weather. It may also be likely that other nearby base stations may be unaffected and remain able to communicate with the server 106. However, for some widespread weather event, this may not be the case. If the base station 140 likely lost connectivity with the server 106 because of weather, then the base station 140 may distribute copies of the plurality of electronic messages to the nearby devices.

When the base station 140 is again able to communicate with the server 106, the base station 140 may transmit the messages to the server 106. The base station 140 may include, with the messages, data indicating that the base station 140 attempted to deliver the messages by transmitting the messages to nearby devices. The data may indicate that the messages may be duplicate messages. If the server 106 determines that one of the duplicate messages received from the base station 140 was already delivered to the recipient, then the server 106 may confirm delivery to the device 148 and bypass transmitting the duplicate message to the recipient. In some instances, the server 106 may not store data indicating whether the original message was delivered. In this case, the server 106 may deliver the duplicate message to the recipient device and confirm delivery to the device 148. If the recipient device already received the message, then the recipient device may ignore the duplicate message.

In some implementations, the base station 140 may transmit the copies of the message to the nearby devices, and, include in the copies, data indicating that the copies are duplicate messages. The server 106 may receive the copies from the nearby devices when the nearby devices are able to communicate with the server 106. In instances where the server 106 receives, at substantially the same time, more than one copy of the same message, the server 106 may transmit one copy of the message to the recipient device. In instances where the server 106 receives, at substantially different times, more than one copy of the same message, the server 106 may transmit both copies of the message to the recipient device. The recipient device may identify the data indicating the message is a copy. If the recipient device previously received the message, then the recipient device will ignore the additional duplicate message.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:
1. A computer-implemented method, comprising:
receiving, by a computing device, data that reflects characteristics of a vehicle;
based on the data that reflects the characteristics of the vehicle, determining, by the computing device, whether to adjust a setting of a base station of a wireless network; and
based on determining whether to adjust the setting of the base station of the wireless network, determining, by the computing device, whether to provide, for output to the base station of the wireless network, an instruction to adjust the setting of the base station.
2. The method of claim 1, wherein the characteristics of the vehicle comprise:

speed data, location data, braking data, engine temperature data, tire pressure data, engine speed data, accelerometer data, gyroscope data, magnetometer data, gravity sensor data, humidity inside the vehicle, humidity outside the vehicle, temperature inside the vehicle, temperature outside the vehicle, windshield wiper status, and atmospheric pressure.

3. The method of claim 1, wherein the setting of the base station is a transmission power level of the base station.

4. The method of claim 1, comprising:
based on the data that reflects the characteristics of the vehicle, determining, by the computing device, an estimated received signal strength indicator for a device communicating with the base station,
wherein determining whether to adjust the setting of the base station of the wireless network is based on the estimated received signal strength indicator.

5. The method of claim 1, comprising:
bypassing receiving, by the computing device and from a device communicating with the base station, a received signal strength indicator.

6. The method of claim 1, wherein the base station is in a vicinity of the vehicle.

7. The method of claim 1, comprising:
based on the data that reflects the characteristics of the vehicle, determining, by the computing device, weather conditions in a vicinity of the vehicle,
wherein determining whether to adjust the setting of the base station of the wireless network is based on the weather conditions in a vicinity of the vehicle.

8. The method of claim 1, wherein:
determining whether to adjust the setting of the base station of the wireless network comprises determining to adjust the setting of the base station, and
determining whether to provide, for output to the base station of the wireless network, the instruction to adjust the setting of the base station comprises providing, for output by the computing device and to the base station, the instruction to adjust the setting of the base station.

9. The method of claim 8, comprising:
based on the data that reflects the characteristics of the vehicle, determining an adjustment for the setting of the base station,
wherein providing, for output, the instruction to adjust the setting of the base station comprises providing, for output, the instruction to adjust the setting of the base station according to the adjustment.

10. The method of claim 1, wherein:
determining whether to adjust the setting of the base station of the wireless network comprises determining to bypass adjusting the setting of the base station, and
determining whether to provide, for output to the base station of the wireless network, the instruction to adjust the setting of the base station comprises bypassing providing, for output by the computing device and to the base station, the instruction to adjust maintain the setting of the base station.

11. A system, comprising:
one or more processors; and
memory including a plurality of computer-executable components that are executable by the one or more processors to perform a plurality of actions, the plurality of actions comprising:
receiving, by a computing device, data that reflects characteristics of a vehicle;
based on the data that reflects the characteristics of the vehicle, determining, by the computing device, whether to adjust a setting of a base station of a wireless network; and
based on determining whether to adjust the setting of the base station of the wireless network, determining, by the computing device, whether to provide, for output to the base station of the wireless network, an instruction to adjust the setting of the base station.

12. The system of claim 11, wherein the characteristics of the vehicle comprise:
speed data, location data, braking data, engine temperature data, tire pressure data, engine speed data, accelerometer data, gyroscope data, magnetometer data, gravity sensor data, humidity inside the vehicle, humidity outside the vehicle, temperature inside the vehicle, temperature outside the vehicle, windshield wiper status, and atmospheric pressure.

13. The system of claim 11, wherein the setting of the base station is a transmission power level of the base station.

14. The system of claim 11, wherein the actions comprise:
based on the data that reflects the characteristics of the vehicle, determining, by the computing device, an estimated received signal strength indicator for a device communicating with the base station,
wherein determining whether to adjust the setting of the base station of the wireless network is based on the estimated received signal strength indicator.

15. The system of claim 11, wherein the actions comprise:
bypassing receiving, by the computing device and from a device communicating with the base station, a received signal strength indicator.

16. The system of claim 11, wherein the base station is in a vicinity of the vehicle.

17. The system of claim 11, wherein the actions comprise:
based on the data that reflects the characteristics of the vehicle, determining, by the computing device, weather conditions in a vicinity of the vehicle,
wherein determining whether to adjust the setting of the base station of the wireless network is based on the weather conditions in a vicinity of the vehicle.

18. The system of claim 11, wherein:
determining whether to adjust the setting of the base station of the wireless network comprises determining to adjust the setting of the base station, and
determining whether to provide, for output to the base station of the wireless network, the instruction to adjust the setting of the base station comprises providing, for output by the computing device and to the base station, the instruction to adjust the setting of the base station.

19. The system of claim 11, wherein:
determining whether to adjust the setting of the base station of the wireless network comprises determining to bypass adjusting the setting of the base station, and
determining whether to provide, for output to the base station of the wireless network, the instruction to adjust the setting of the base station comprises bypassing providing, for output by the computing device and to the base station, the instruction to adjust maintain the setting of the base station.

20. One or more non-transitory computer-readable media of a computing device storing computer-executable instructions that upon execution cause one or more computers to perform acts comprising:
receiving, by a computing device, data that reflects characteristics of a vehicle;

based on the data that reflects the characteristics of the vehicle, determining, by the computing device, whether to adjust a setting of a base station of a wireless network; and based on determining whether to adjust the setting of the base station of the wireless network, determining, by the computing device, whether to provide, for output to the base station of the wireless network, an instruction to adjust the setting of the base station.

\* \* \* \* \*